(12) United States Patent
Nagamori

(10) Patent No.: US 8,804,173 B2
(45) Date of Patent: Aug. 12, 2014

(54) APPARATUS MANAGEMENT DEVICE AND METHOD FOR MERGING ADDITIONAL INFORMATION IDENTIFIERS INTO INFORMATION ACQUISITION REQUESTS

(75) Inventor: Akira Nagamori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 13/298,596

(22) Filed: Nov. 17, 2011

(65) Prior Publication Data

US 2012/0140270 A1 Jun. 7, 2012

(30) Foreign Application Priority Data

Dec. 2, 2010 (JP) .................................. 2010-269016

(51) Int. Cl.
*G06F 3/12* (2006.01)
(52) U.S. Cl.
CPC ............ *G06F 3/1203* (2013.01); *G06F 3/122* (2013.01); *G06F 3/1287* (2013.01); *G06F 3/1273* (2013.01); *G06F 3/1229* (2013.01)
USPC ........... 358/1.15; 707/758; 709/224; 718/103
(58) Field of Classification Search
None
See application file for complete search history.

(56) References Cited

U.S. PATENT DOCUMENTS

| | | | | |
|---|---|---|---|---|
| 7,143,153 | B1* | 11/2006 | Black et al. | 709/223 |
| 7,421,458 | B1* | 9/2008 | Taylor et al. | 1/1 |
| 7,701,599 | B2* | 4/2010 | Kumashio | 358/1.15 |
| 8,005,725 | B2* | 8/2011 | Takahashi et al. | 705/26.8 |
| 2002/0176377 | A1* | 11/2002 | Hamilton | 370/328 |
| 2004/0162838 | A1* | 8/2004 | Murayama et al. | 707/100 |
| 2005/0071495 | A1* | 3/2005 | Kadota | 709/232 |
| 2005/0099962 | A1* | 5/2005 | Matsuda | 370/254 |
| 2005/0144597 | A1* | 6/2005 | Wolf | 717/136 |
| 2006/0291880 | A1* | 12/2006 | Kitora | 399/27 |
| 2007/0011159 | A1* | 1/2007 | Hillis et al. | 707/6 |
| 2007/0073863 | A1* | 3/2007 | Motoyama et al. | 709/224 |
| 2007/0206217 | A1* | 9/2007 | Maruyama | 358/1.15 |
| 2008/0104032 | A1* | 5/2008 | Sarkar | 707/3 |
| 2008/0244456 | A1* | 10/2008 | Shimizu et al. | 715/840 |
| 2008/0252910 | A1* | 10/2008 | Cordesses et al. | 358/1.1 |
| 2008/0309966 | A1* | 12/2008 | Scaff | 358/1.15 |
| 2009/0089255 | A1* | 4/2009 | Jeong et al. | 707/3 |
| 2009/0128853 | A1* | 5/2009 | Kusakabe | 358/1.15 |

(Continued)

FOREIGN PATENT DOCUMENTS

| | | |
|---|---|---|
| JP | 11-187186 | 7/1999 |
| JP | 2010-061459 | 3/2010 |
| JP | 2010-198125 | 9/2010 |
| JP | 2011-097461 | 5/2011 |

*Primary Examiner* — Vincent Rudolph
*Assistant Examiner* — Edwin S Leland, III
(74) *Attorney, Agent, or Firm* — IPUSA, PLLC

(57) ABSTRACT

An information processing apparatus includes a storing unit, a determining unit, and a merging unit. The storing unit stores control data including apparatus identifiers identifying communication apparatuses and requested information identifiers identifying information items specified in information acquisition requests for the communication apparatuses. The determining unit determines whether a specified communication apparatus specified in a newly-received information acquisition request is already registered in the control data. If the specified communication apparatus is already registered in the control data, the merging unit determines whether a requested information identifier specified in the newly-received information acquisition request is recorded in the control data for the specified communication apparatus. If the requested information identifier is not recorded in the control data, the merging unit adds the requested information identifier to a list of requested information identifiers associated with an information acquisition job for the specified communication apparatus.

5 Claims, 12 Drawing Sheets

(56) References Cited

U.S. PATENT DOCUMENTS

| | | | |
|---|---|---|---|
| 2009/0168102 A1* | 7/2009 | Nakamura | 358/1.15 |
| 2009/0178042 A1* | 7/2009 | Mehta et al. | 718/101 |
| 2010/0057904 A1* | 3/2010 | Nagamori | 709/224 |
| 2010/0082709 A1* | 4/2010 | Yamamoto | 707/812 |
| 2010/0191759 A1* | 7/2010 | Li et al. | 707/759 |
| 2010/0271663 A1* | 10/2010 | Kadota | 358/1.15 |
| 2010/0332636 A1* | 12/2010 | Sato et al. | 709/223 |
| 2011/0051174 A1* | 3/2011 | Hattori | 358/1.15 |
| 2011/0231433 A1* | 9/2011 | Tabata et al. | 707/769 |
| 2011/0286036 A1* | 11/2011 | Kobayashi | 358/1.15 |
| 2011/0299115 A1* | 12/2011 | Toda et al. | 358/1.15 |
| 2012/0033256 A1* | 2/2012 | Kawajiri | 358/1.15 |
| 2012/0133974 A1* | 5/2012 | Nakamura | 358/1.15 |
| 2013/0060924 A1* | 3/2013 | Zhang et al. | 709/223 |

\* cited by examiner

| ACQUISITION ORDER | APPARATUS IDENTIFIER | REQUESTED INFORMATION |
|---|---|---|
| 1 | COMMUNICATION APPARATUS B | STATUS, COUNTER, SUPPLY |
| 2 | COMMUNICATION APPARATUS A | STATUS, COUNTER |
| 3 | COMMUNICATION APPARATUS C | SUPPLY |
| ... | ... | ... |

FIG.9

| ACQUISITION ORDER | APPARATUS IDENTIFIER | REQUESTED INFORMATION | PRIORITY LEVEL |
|---|---|---|---|
| 1 | COMMUNICATION APPARATUS B | STATUS, COUNTER, SUPPLY | 5 |
| 2 | COMMUNICATION APPARATUS A | STATUS, COUNTER | 4 |
| 3 | COMMUNICATION APPARATUS C | SUPPLY | 3 |
| ... | ... | ... | ... |

31D

APPARATUS MANAGEMENT DEVICE AND METHOD FOR MERGING ADDITIONAL INFORMATION IDENTIFIERS INTO INFORMATION ACQUISITION REQUESTS

CROSS-REFERENCE TO RELATED APPLICATION

The present application is based upon and claims the benefit of priority of Japanese Patent Application No. 2010-269016, filed on Dec. 2, 2010, the entire contents of which are incorporated herein by reference.

BACKGROUND OF THE INVENTION

1. Field of the Invention

An aspect of this disclosure relates to an apparatus management system.

2. Description of the Related Art

There are known systems (hereafter called apparatus management systems) that obtain apparatus information from managed apparatuses (hereafter called communication apparatuses) such as printers and multifunction peripherals having communication functions and thereby manage the communication apparatuses.

For example, Japanese Laid-Open Patent Publication No. 11-187186 discloses a system where a central controller for apparatus management periodically obtains the numbers of printed pages (i.e., apparatus information) via data communication apparatuses from multiple image forming apparatuses (communication apparatuses) to be managed.

However, with related-art methods and configurations, the communication load and the processing time for obtaining apparatus information from communication apparatuses to be managed may increase drastically as the scale of the apparatus management system increases.

With globalization of companies, there is a demand for an apparatus management system that can centrally manage thousands or tens of thousands of communication apparatuses. In such a large-scale apparatus management system, it is preferable, for example, to standardize information to be obtained from communication apparatuses and thereby efficiently perform information acquisition processes. However, since communication apparatuses have many types of information, a type of apparatus information to be obtained from a communication apparatus may not always be common to other communication apparatuses.

Therefore, in an apparatus management system, different information acquisition processes need to be performed for different types of apparatus information of the same communication apparatus. Accordingly, a huge number of information acquisition processes need to be performed in an apparatus management system for managing a large number of communication apparatuses. This in turn increases the communication load and the processing time.

Thus, there is a demand for an apparatus management system that can manage a large number of communication apparatuses while reducing the communication load and the processing time.

SUMMARY OF THE INVENTION

In an aspect of this disclosure, there is provided an information processing apparatus connected via a data communication channel to communication apparatuses. The information processing apparatus includes a storing unit, a determining unit, and a merging unit. The storage unit stores control data where the communication apparatuses are registered when information acquisition jobs are generated in response to information acquisition requests for the communication apparatuses. The control data include apparatus identifiers identifying the communication apparatuses and requested information identifiers identifying information items specified in the information acquisition requests. The determining unit searches the control data based on an apparatus identifier of a specified communication apparatus specified in a newly-received information acquisition request and determines whether the specified communication apparatus is already registered in the control data based on the search result. The merging unit determines, if the specified communication apparatus is already registered in the control data, whether a requested information identifier specified in the newly-received information acquisition request is recorded in the control data in association with the apparatus identifier of the specified communication apparatus. If the requested information identifier is not recorded in the control data in association with the apparatus identifier of the specified communication apparatus, the merging unit adds the requested information identifier to a list of requested information identifiers associated with the information acquisition job for the specified communication apparatus.

BRIEF DESCRIPTION OF THE DRAWINGS

FIG. 5 is a table illustrating an exemplary configuration of an apparatus list (control data) according to the first embodiment;

FIG. 9 is a table illustrating an exemplary configuration of an apparatus list (control data) according to the second embodiment;

DESCRIPTION OF THE PREFERRED EMBODIMENTS

Preferred embodiments of the present invention are described below with reference to the accompanying drawings.

<<First Embodiment>>
<System Configuration>

Figure 1:
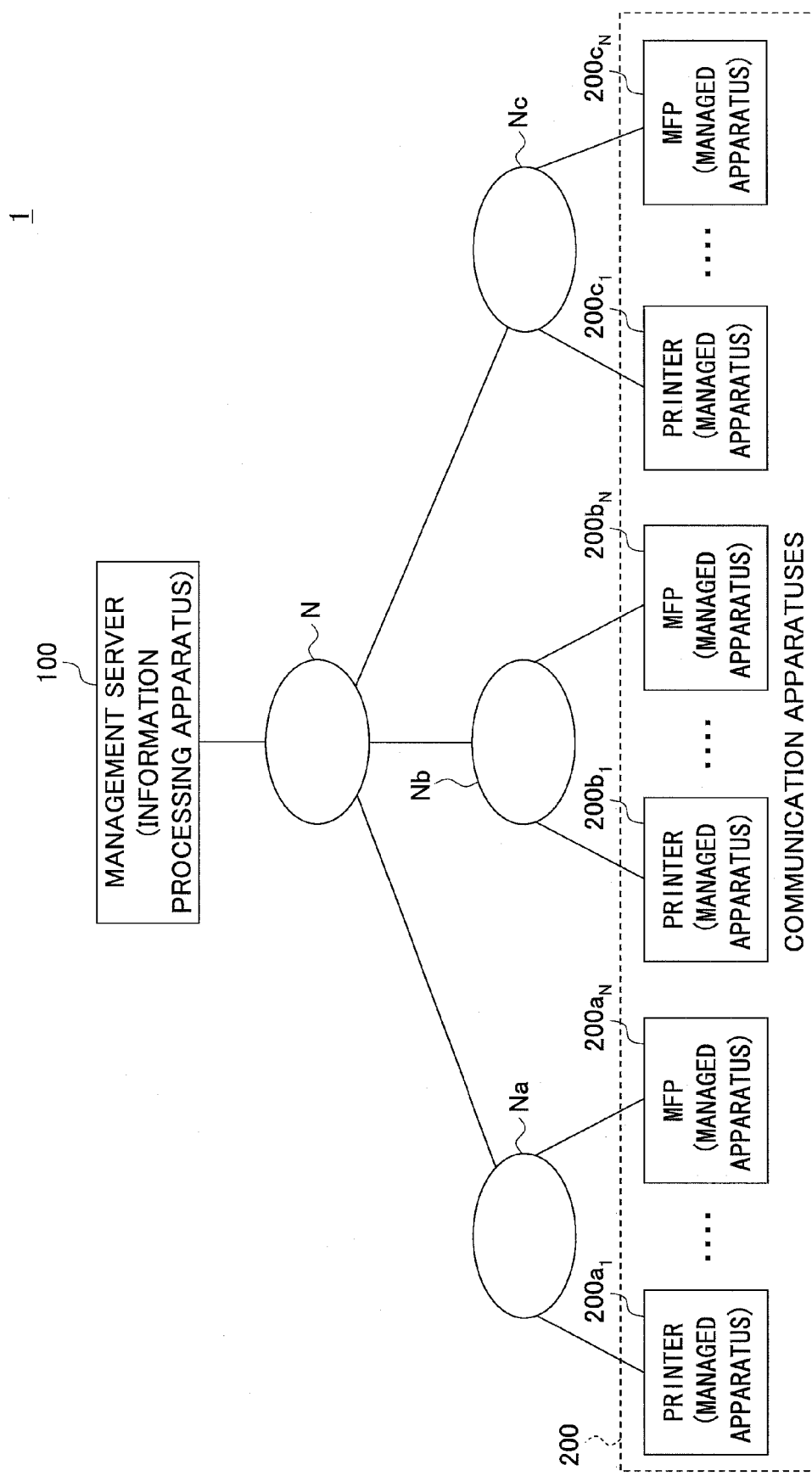
FIG. 1 is a drawing illustrating an exemplary configuration of an apparatus management system according to a first embodiment.

FIG. 1 is a drawing illustrating an exemplary configuration of an apparatus management system 1 according to a first embodiment.

As illustrated in FIG. 1, the apparatus management system 1 includes communication apparatuses $200a_1$-$200a_N$, $200b_1$-$200b_N$, and $200c_1$-$200c_N$ (may be called the communication apparatus(es) 200 when distinction is not necessary) and a management server 100 for managing the communication apparatuses 200. The communication apparatuses 200 are connected to each other via data communication channels Na, Nb, and Nc such as networks (e.g., local area networks (LAN)) and are also connected to the management server 100 via a data communication line N such as a network. Hereafter, the communication lines N, Na, Nb, and Nc may be called a network(s) N when distinction is not necessary. Thus, in the apparatus management system 1, multiple networks N connecting the communication apparatuses 200 are combined and connected to the management server 100.

The communication apparatus 200 is a managed apparatus to be managed by the management server 100. For example, the communication apparatus 200 may be an image forming apparatus such as a printer or a multifunction peripheral (MFP) having a communication function. The management server 100 may be an information processing apparatus that obtains apparatus information from the communication apparatuses 200 and thereby manages the communication apparatuses 200.

With the above system configuration, the apparatus management system 1 can centrally manage the communication apparatuses 200 and provide a large-scale apparatus management service.

<Hardware Configuration>

An exemplary hardware configuration of the management server 100 is described below.

Figure 2:
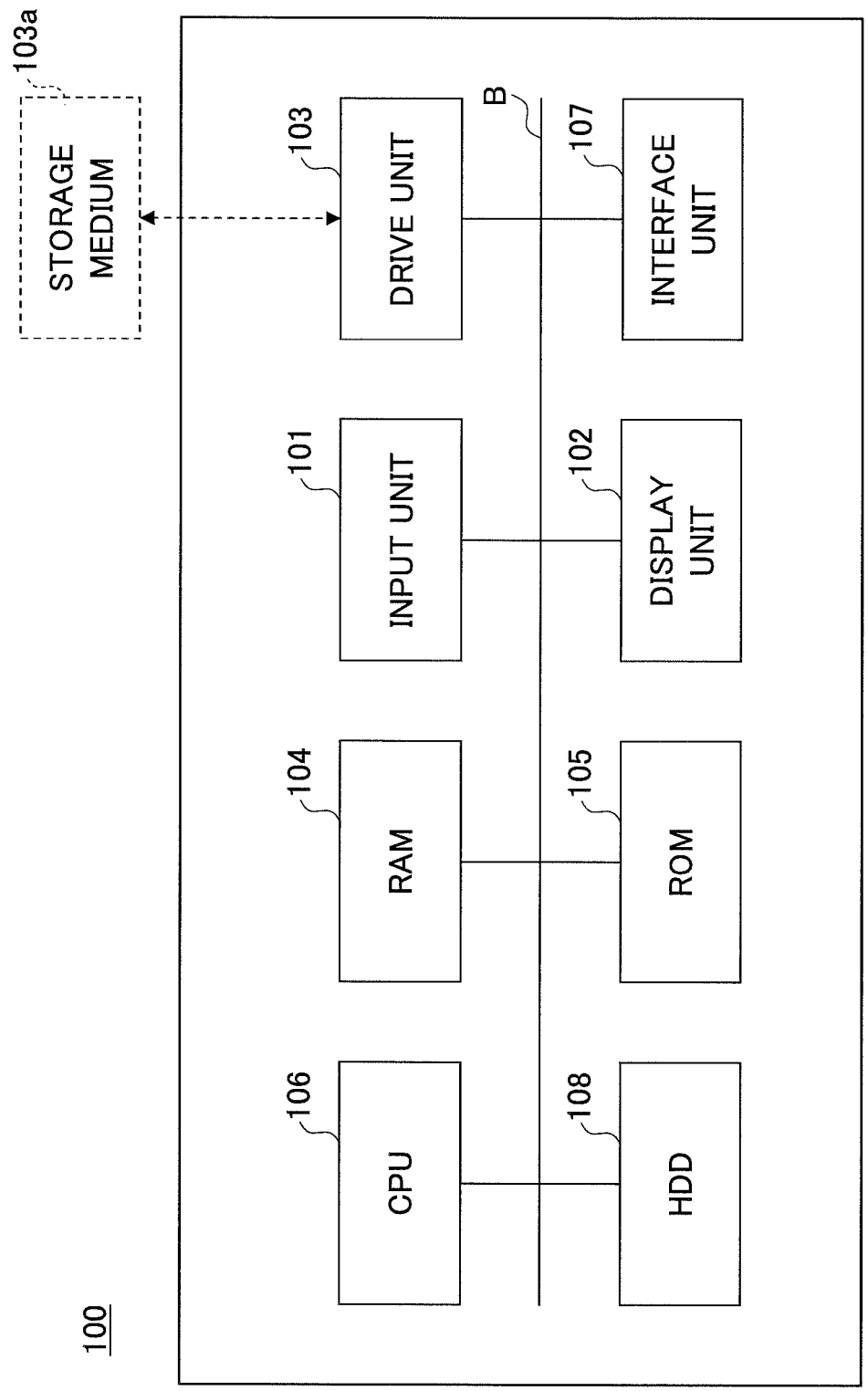
FIG. 2 is a block diagram illustrating an exemplary hardware configuration of a management server (information processing apparatus)

FIG. 2 is a block diagram illustrating an exemplary hardware configuration of the management server (information processing apparatus) 100.

As illustrated in FIG. 2, the management server 100 may include an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a keyboard and a mouse, and is used to input instructions (or operation signals) to the management server 100. The display unit 102 displays, for example, processing results of the management server 100.

The interface unit 107 connects the management server 100 to the network N. The management server 100 can communicate with the communication apparatuses 200 via the interface unit 107.

The HDD 108 is a non-volatile storage medium for storing various programs and data. For example, the HDD 108 stores basic software (e.g., an operating system such as Windows (trademark/registered trademark) or UNIX (trademark/registered trademark)) for controlling the entire management server 100, and applications that are executed on the basic software to implement various functions (e.g., apparatus management functions). The HDD 108 may manage the stored programs and data using a file system and/or a database (DB).

The drive unit 103 is an interface between the management server 100 and a removable storage medium 103a. The management server 100 can read and write data from and to the storage medium 103a via the drive unit 103. Examples of the storage medium 103a include a floppy (flexible) disk (FD), a compact disk (CD), a digital versatile disk (DVD), a secure digital (SD) memory card, and a universal serial bus (USB) memory.

The ROM 105 is a non-volatile semiconductor memory (storage unit) that can retain data even when the power is turned off. For example, the ROM 105 stores programs and data such as a basic input/output system (BIOS) that is executed when the management server 100 is turned on, and system and network settings of the management server 100. The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the management server 100 and to implement various functional units of the management server 100.

With the above hardware configuration, the management server 100 can provide various information processing functions (information processing services) related to apparatus management.

<Information Processing Functions>

Exemplary information processing functions of the management server 100 are described below.

When an information acquisition request is received, the management server 100 determines whether a communication apparatus 200 specified in the information acquisition request is already registered in an apparatus list where queued (or waiting) communication apparatuses 200 (whose information has been requested but has not been obtained yet) are registered. If the communication apparatus 200 specified in the information acquisition request is already registered in the apparatus list, the management server 100 adds a requested information identifier (an identifier of a requested information item) specified in the information acquisition request to a requested information list (a list of requested information identifiers) of the communication apparatus 200, i.e., merges requested information identifiers for the communication apparatus 200. The management server 100 of the first embodiment provides information processing functions as described above.

With globalization of companies, there is a demand for an apparatus management system that can centrally manage thousands or tens of thousands of communication apparatuses. However, with related-art methods and configurations, the communication load and the processing time for obtaining apparatus information from communication apparatuses may increase drastically as the scale of the apparatus management system increases.

In such a large-scale apparatus management system, it is preferable, for example, to standardize information to be obtained from communication apparatuses and thereby efficiently perform information obtaining processes. However, since communication apparatuses have many types of information, a type of apparatus information to be obtained from a communication apparatus may not always be common to other communication apparatuses.

Figure 3:
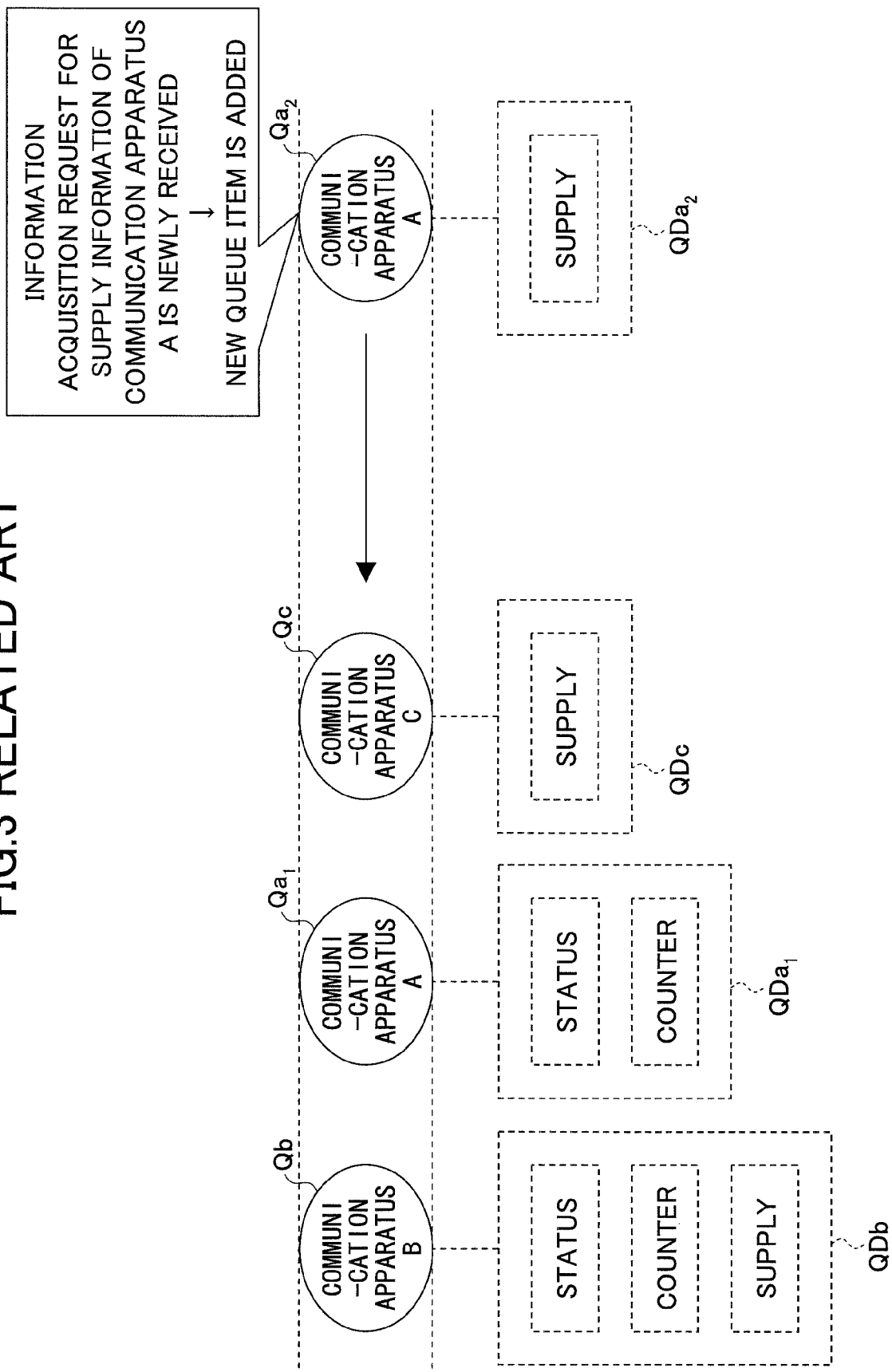
FIG. 3 is a drawing used to describe a related-art information acquisition control process.

FIG. 3 is a drawing used to describe a related-art information acquisition control process.

In FIG. 3, it is assumed that different information obtaining processes are performed for different types of apparatus information of the same communication apparatus 200.

When information acquisition requests for communication apparatuses B, A, and C are received in this order, the management server 100 generates a queue (information acquisition queue) including information acquisition queue items Qb, $Qa_1$, and Qc (may be called an information acquisition queue item(s) Q when distinction is not necessary) and stores the queue in a predetermined storage area. The information acquisition queue items Qb, $Qa_1$, and Qc are associated with requested information lists QDb, $QDa_1$, and QDc (may be called a requested information list(s) QD when distinction is not necessary) specified in the information acquisition requests for the communication apparatuses B, A, and C. In other words, the information acquisition queue items Q are information acquisition jobs for the respective communication apparatuses 200.

A queue is one of basic data structures in a computer. A data item placed in a queue first is processed first (i.e., First In First Out (FIFO)). In this example, the management server 100 takes the information acquisition queue item Qb out of the queue and processes it first. While the information acquisition queue item Qb is being processed, the information acquisition queue items $Qa_1$ and Qc are kept in the queue in a wait state.

If a new information acquisition request (request for supply information) for the communication apparatus A is received while the information acquisition queue items $Qa_1$ and Qc are in the wait state, the management server 100 generates an information acquisition queue item $Qa_2$ associated with a requested information list $QDa_2$ for the communication apparatus A and places the generated information acquisition queue item $Qa_2$ after the information acquisition queue item Qc for the communication apparatus C in the queue. As a result, two information acquisition queue items $Qa_1$ and $Qa_2$ are placed in the queue for the same communication apparatus A.

Thus, with the related-art method described above, if information items of the same communication apparatus 200 are requested at different timings, multiple information acquisition processes are performed for the same communication apparatus 200. Accordingly, the related-art method drastically increases the communication load and the processing time when applied to a large-scale apparatus management system for managing a large number of communication apparatuses.

An aspect of this disclosure makes it possible to provide an apparatus management system that can manage a large number of communication apparatuses while reducing the communication load and the processing time.

In the first embodiment, if an information acquisition request is newly received for a communication apparatus 200 for which an information acquisition queue item is already in the queue, the management server 100 adds a requested information identifier specified in the newly-received information acquisition request to a requested information list associated with the information acquisition queue item of the communication apparatus 200 and thereby merges the requested information identifiers for the communication apparatus 200.

Accordingly, in the apparatus management system 1 of the first embodiment, even if information items of the same communication apparatus 200 are requested at different timings, the information items are obtained in a single information acquisition process (instead of in separate information acquisition processes) performed for a preceding information acquisition request. This configuration makes it possible to reduce, for example, the number of communication packets, the overhead, and the number of sessions necessary to obtain apparatus information and thereby makes it possible to reduce the communication load and the processing time in a large-scale apparatus management system.

An exemplary functional configuration and exemplary operations of the management server 100 are described below.

Figure 4:
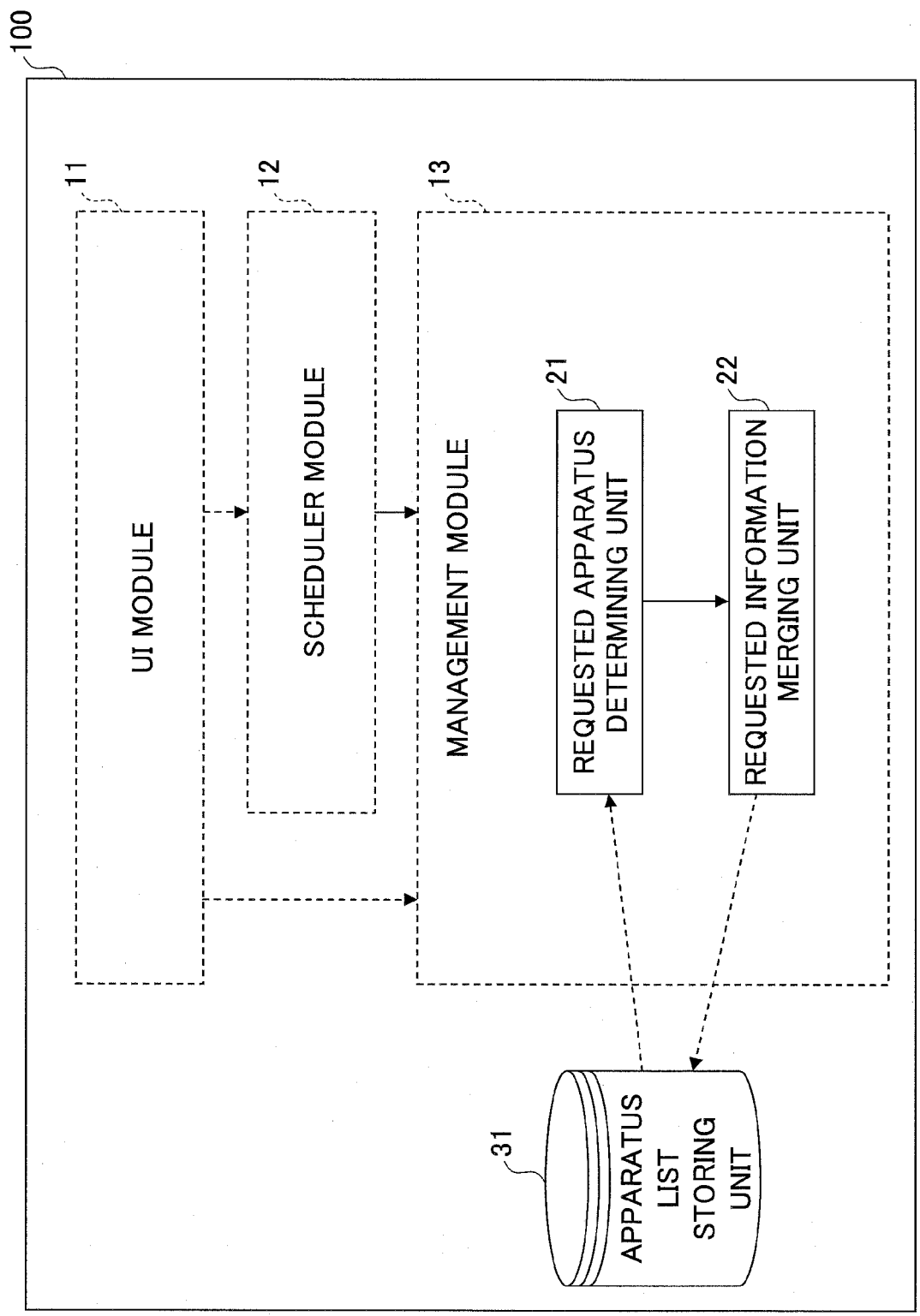
FIG. 4 is a block diagram illustrating an exemplary functional configuration of a management server according to the first embodiment.

FIG. 4 is a block diagram illustrating an exemplary functional configuration of the management server 100 according to the first embodiment.

As illustrated in FIG. 4, the management server 100 may include a user interface (UI) module 11, a scheduler module 12, and a management module 13. The management module 13 includes a requested apparatus determining unit 21 and a requested information merging unit 22.

Functions and operations of the UI module 11, the scheduler module 12, and the management module 13 are described below.

<UI Module>

The UI module 11 is a program that implements a UI function (or provides a UI service) for apparatus management. For example, the UI module 11 receives information acquisition requests (including, for example, identifiers of communication apparatuses and requested information items) from an administrator (or a user, etc.) and reports (or displays) obtained information items to the administrator. The UI module 11 is executed on the management server 100 to provide the UI service as described above.

<Scheduler Module>

The scheduler module 12 is a program that implements a scheduling function (or provides a function execution scheduling service) for apparatus management. In automatic apparatus management, information is obtained from the communication apparatuses 200 by, for example, polling the communication apparatuses 200. Accordingly, in automatic apparatus management, information acquisition processes are performed according to a predetermined schedule (e.g., at predetermined intervals). The scheduler module 12 is executed on the management server 100 to request the management module 13 to perform information acquisition processes according to a predetermined schedule, i.e., to provide the function execution scheduling service.

<Management Module>

The management module 13 is a program that implements an apparatus management function (or provides an apparatus management service). The management module (or the apparatus management function) receives information acquisition requests from the UI module 11 and/or the scheduler module 12 and obtains apparatus information from the communication apparatuses 200 specified in the information acquisition requests. The management module 13 stores the obtained apparatus information in a predetermined storage area of, for example, the HDD 108 of the management server 100. Further, the management module 13 manages the communication apparatuses 200 based on the stored apparatus information. The management module 13 is executed on the management server 100 to provide the apparatus management service as described above.

As described above, the management module 13 includes the requested apparatus determining unit 21 and the requested information merging unit 22 for controlling information acquisition processes.

The requested apparatus determining unit 21 determines whether apparatus information has already been requested for a communication apparatus 200 specified in an information acquisition request. When an information acquisition request is received, the requested apparatus determining unit 21 refers to an apparatus list where queued communication apparatuses 200 (whose apparatus information has been requested but has not been obtained yet) are registered, and thereby determines whether a communication apparatus 200 specified in the information acquisition request is already registered in the apparatus list. Here, the apparatus list is control data regarding information acquisition queue items Q in a queue for obtaining apparatus information and is stored and managed in an apparatus list storing unit 31. The apparatus list storing unit 31 is, for example, implemented by a storage area of a storage unit (e.g., the HDD 108) of the management server 100.

Details of the apparatus list (control data) are described below. FIG. 5 is a table illustrating an exemplary configuration of an apparatus list (control data) 31D.

As illustrated in FIG. 5, the apparatus list 31D includes an acquisition order field, an apparatus identifier field, and a requested information field for each of the communication apparatuses 200 whose apparatus information has been requested.

The acquisition order field contains information (information acquisition order information) indicating the order in which apparatus information is obtained. In other words, the acquisition order field contains information (request reception order information) indicating the order in which information acquisition requests are received. For example, the acquisition order field may contain sequential numbers assigned to received information acquisition requests. The apparatus identifier field contains information (apparatus identifiers) for identifying the communication apparatuses 200 specified in information acquisition requests. For example, the apparatus identifier field may contain character strings indicating names of the communication apparatuses 200 or network settings (e.g., Internet protocol (IP) addresses) assigned to the communication apparatuses 200. The requested information field contains information (requested information identifiers) for identifying requested information items specified in information acquisition requests. For example, the requested information field may contain character strings indicating names of requested information items or management IDs (e.g., object identifiers (OIDs) in management information base (MIB)) assigned to the requested information items. The information acquisition order information, the apparatus identifiers, and the requested information identifiers are associated with each other in the apparatus list 31D.

The field values in the apparatus list 31D are recorded and updated by the management module 13. For example, when generating an information acquisition queue item Q in response to a received information acquisition request, the management module 13 accesses the apparatus list storing unit 31 and records data corresponding to the received information acquisition request in the apparatus list 31D. Meanwhile, when processing an information acquisition queue item Q, the management module 13 deletes (or removes) the data corresponding to the information acquisition queue item Q and updates the information acquisition order information to reorder remaining information acquisition queue items Q (such that the next information acquisition queue item Q becomes the first item to be processed).

Referring back to FIG. 4, the requested apparatus determining unit 21 determines whether a communication apparatus 200 specified in a newly-received information acquisition request is registered in the apparatus list 31D as described below. The requested apparatus determining unit 21 searches the apparatus list 31D based on the apparatus identifier of the communication apparatus 200 specified in the newly-received information acquisition request. If the apparatus identifier is found in the apparatus list 31D, the requested apparatus determining unit 21 determines that the communication apparatus 200 specified in the newly-received information acquisition request is already registered in the apparatus list 31D (i.e., that an information acquisition request for the communication apparatus 200 has already been received). Meanwhile, if the apparatus identifier is not found in the apparatus list 31D, the requested apparatus determining unit 21 determines that the communication apparatus 200 specified in the newly-received information acquisition request is not registered in the apparatus list 31D (i.e., that no information acquisition request for the communication apparatus 200 has been received). In other words, the requested apparatus determining unit 21 determines whether an information acquisition queue item Q for the communication apparatus 200 is in the queue by determining whether the communication apparatus 200 is registered in the application list 31D.

The requested information merging unit 22 merges requested information identifiers for the same communication apparatus 200 into the requested information list of one information acquisition queue item Q of the communication apparatus 200. When the requested apparatus determining unit 21 determines that the communication apparatus 200 specified in the newly-received information acquisition request is already registered in the apparatus list 31D, the requested information merging unit 22 refers to the requested information field of the apparatus list 31D corresponding to the communication apparatus 200. If a requested information identifier specified in the newly-received information acquisition request is not included in the requested information field of the apparatus list 31D, the requested information merging unit 22 adds the requested information identifier to the requested information list associated with the corresponding information acquisition queue item Q and thereby merges the requested information identifiers for the communication apparatus 200. When merging the requested information identifiers, the requested information merging unit 22 also updates the requested information field of the apparatus list 31D.

Exemplary operations of the requested information merging unit 22 are described below with reference to FIG. 6.

Figure 6:
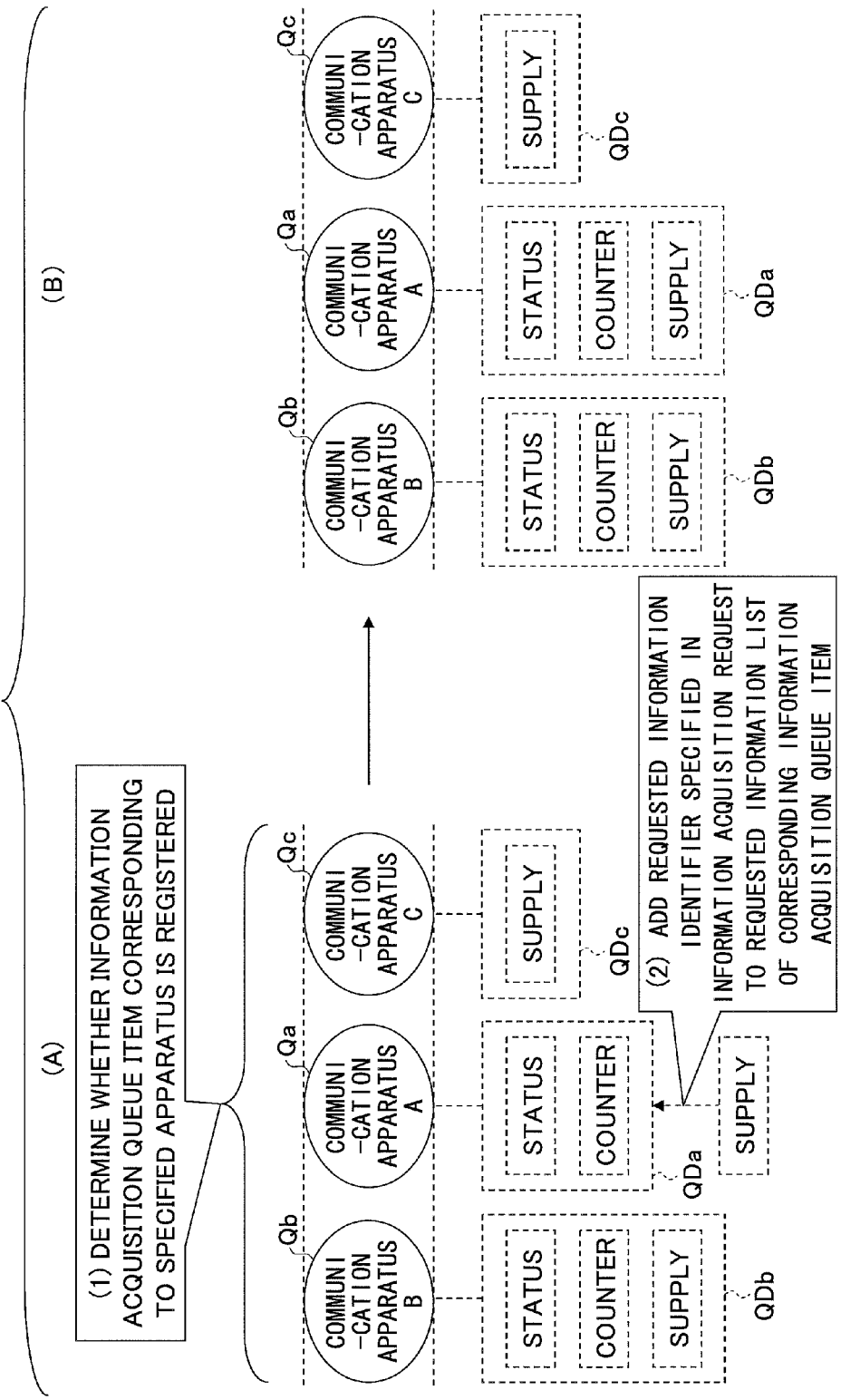
FIG. 6 is a drawing used to describe a process of merging requested information identifiers according to the first embodiment.

FIG. 6 is a drawing used to describe a process of merging requested information identifiers according to the first embodiment.

In FIG. 6, it is assumed that information acquisition queue items Qb, Qa, and Qc for communication apparatuses B, A, and C are in the queue and an information acquisition request (for supply information) for the communication apparatus A is newly received. FIG. (A) illustrates requested information identifiers for the communication apparatus A before they are merged, and FIG. 6 (B) illustrates the requested information identifiers for the communication apparatus A after they are merged.

As illustrated in FIG. 6 (A), the requested apparatus determining unit 21 determines that the communication apparatus A for which the information acquisition request has been newly received is already registered in the apparatus list 31D. In other words, the requested apparatus determining unit 21 determines that the information acquisition queue item Qa for the communication apparatus A is in the queue.

Based on the determination result of the requested apparatus determining unit 21, the requested information merging unit 22 adds the requested information identifier of the supply information to a requested information list QDa of the information acquisition queue item Qa for the communication apparatus A. As a result, as illustrated in FIG. 6 (B), the requested information identifiers for the communication apparatus A are merged into the requested information list QDa of the information acquisition queue item Qa.

With the above configuration, even if information items of the same communication apparatus 200 are requested at different timings, the information items are obtained in a single information acquisition process (instead of in separate information acquisition processes) performed for a preceding information acquisition request.

As described above, information processing functions of the management server 100 of the first embodiment are provided through collaboration among the functional units. The functional units are implemented by executing modules (i.e., programs for implementing apparatus management functions) installed in the management server 100. For example, the programs are loaded by a processing unit (e.g., the CPU 106) from storage units (e.g., the HDD 108 and/or the ROM 105) into a memory (e.g., the RAM 104) and are executed to implement the functional units of the management server 100.

An exemplary process performed by the functional units of the management server 100 of the first embodiment (collaboration among the functional units) is described below with reference to FIG. 7.

<Information Acquisition Control Process>

Figure 7:
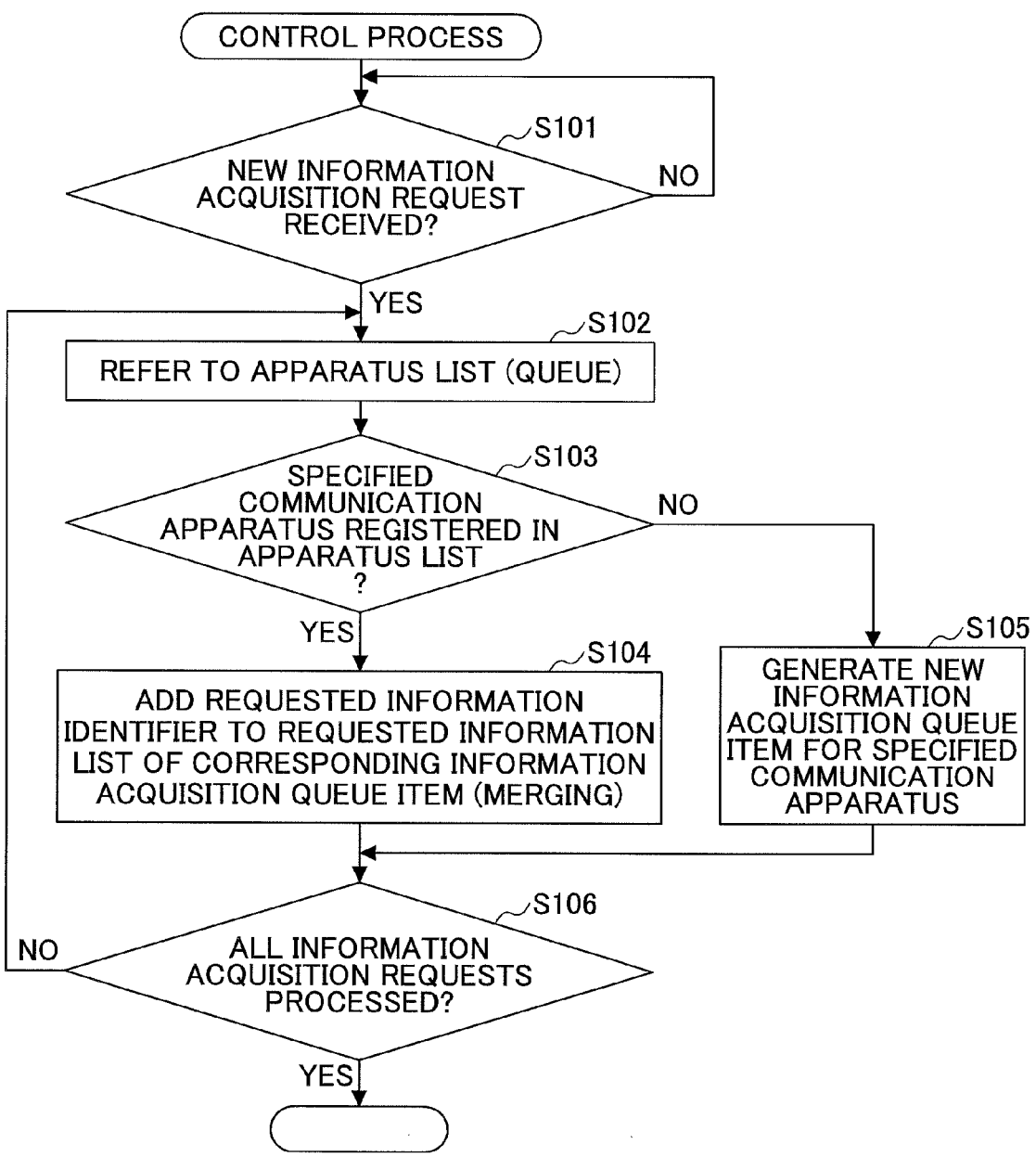
FIG. 7 is a flowchart illustrating an exemplary information acquisition control process according to the first embodiment.

FIG. 7 is a flowchart illustrating an exemplary information acquisition control process according to the first embodiment.

As illustrated in FIG. 7, when the management module 13 of the management server 100 newly receives an information acquisition request (YES in step S101), a control process is performed as described below.

The requested apparatus determining unit 21 accesses the apparatus list storing unit 31 to refer to the apparatus list 31D (step S102).

Next, the requested apparatus determining unit 21 determines whether the communication apparatus 200 specified in the newly-received information acquisition request is registered in the apparatus list 31D (step S103). More specifically, the requested apparatus determining unit 21 searches the apparatus identifier field of the apparatus list 31D based on the apparatus identifier specified in the newly-received information acquisition request and thereby determines whether the communication apparatus 200 is registered in the apparatus list 31D. Then, the requested apparatus determining unit 21 outputs the determination result to the requested information merging unit 22.

If the communication apparatus 200 specified in the newly-received information acquisition request is registered in the apparatus list 31D (YES in step S103), the requested information merging unit 22 adds a requested information identifier specified in the newly-received information acquisition request to a requested information list of the information acquisition queue item Q corresponding to the communication apparatus 200 and thereby merges requested information identifiers for the communication apparatus 200 (step S104). More specifically, the requested information merging unit 22 accesses the apparatus list storing unit 31 to refer to the requested information field of the apparatus list 31D corresponding to the communication apparatus 200. If the requested information identifier specified in the information acquisition request is not in the requested information field, the requested information merging unit 22 merges the requested information identifiers for the communication apparatus 200 into the requested information list and also updates the requested information field of the apparatus list 31D.

If the communication apparatus 200 specified in the information acquisition request is not registered in the apparatus list 31D (NO in step S103), the requested information merging unit 22 newly generates an information acquisition queue item Q including the requested information identifier specified in the information acquisition request for the communication apparatus 200 (step S105). Also, the requested information merging unit 22 accesses the apparatus list storing unit 31 to add information regarding the newly-generated information apparatus queue item Q to the apparatus list 31D.

After the requested information merging step (step S104) or the generating step (step S105) is performed by the requested information merging unit 22, the requested apparatus determining unit 21 determines whether all newly-received information acquisition requests for the communication apparatuses 200 have been processed (i.e., whether steps S102 through S104/S105 have been performed for all the communication apparatuses 200 for which information acquisition requests are newly received) (step S106).

If all the newly-received information acquisition requests have been processed (YES in step S106), the requested apparatus determining unit 21 terminates the control process.

Meanwhile, if not all the newly-received information acquisition requests have been processed (NO in step S106), the control process returns to step S102 and steps S102 through S105 are repeated for the remaining information acquisition requests.

<Summary>

The management module 13 of the management server 100 of the first embodiment provides information processing functions as described below.

When an information acquisition request is newly received, the requested apparatus determining unit refers to the apparatus list 31D where queued communication apparatuses 200 are registered, and thereby determines whether a communication apparatus 200 specified in the newly-received information acquisition request is already registered in the apparatus list 31D. If the communication apparatus 200 specified in the newly-received information acquisition request is already registered in the apparatus list 31D, the requested information merging unit 22 of the management module 13 adds a requested information identifier specified in the newly-received information acquisition request to a requested information list of the communication apparatus 200 and thereby merges requested information identifiers for the communication apparatus 200.

With the above configuration of the apparatus management system 1 of the first embodiment, even if information items of the same communication apparatus 200 are requested at different timings, the information items are obtained in a single information acquisition process (instead of in separate information acquisition processes) performed for a preceding information acquisition request. Accordingly, the first embodiment makes it possible to reduce, for example, the number of communication packets, the overhead, and the number of sessions necessary to obtain apparatus information and thereby makes it possible to reduce the communication load and the processing time in a large-scale apparatus management system.

<<Second Embodiment>>

In managing apparatuses, the administrator may need to confirm a specific information item of a specific communication apparatus. However, in a large-scale apparatus management system where information acquisition processes for a large number of communication apparatuses are being performed, the administrator may not be able to quickly obtain a requested information item from a specified communication apparatus.

For example, in an apparatus management system where information acquisition processes are being performed for thousands of communication apparatuses, an information acquisition request from the administrator for a specific communication apparatus may be processed by the management server after preceding information acquisition processes are completed. As a result, the administrator needs to wait for a long time before the requested information is obtained.

For the above reason, an apparatus management system is preferably configured to preferentially process an information acquisition request from the administrator.

In a second embodiment, the management server 100 is configured to process information acquisition requests in the order of priorities.

This configuration makes it possible to improve the convenience of the administrator (or users) and to provide a high-quality apparatus management service.

In the second embodiment, descriptions overlapping those in the first embodiment are omitted, and the same reference numbers as those used in the first embodiment are assigned to the corresponding components.

<Functional Configuration>

Figure 8:
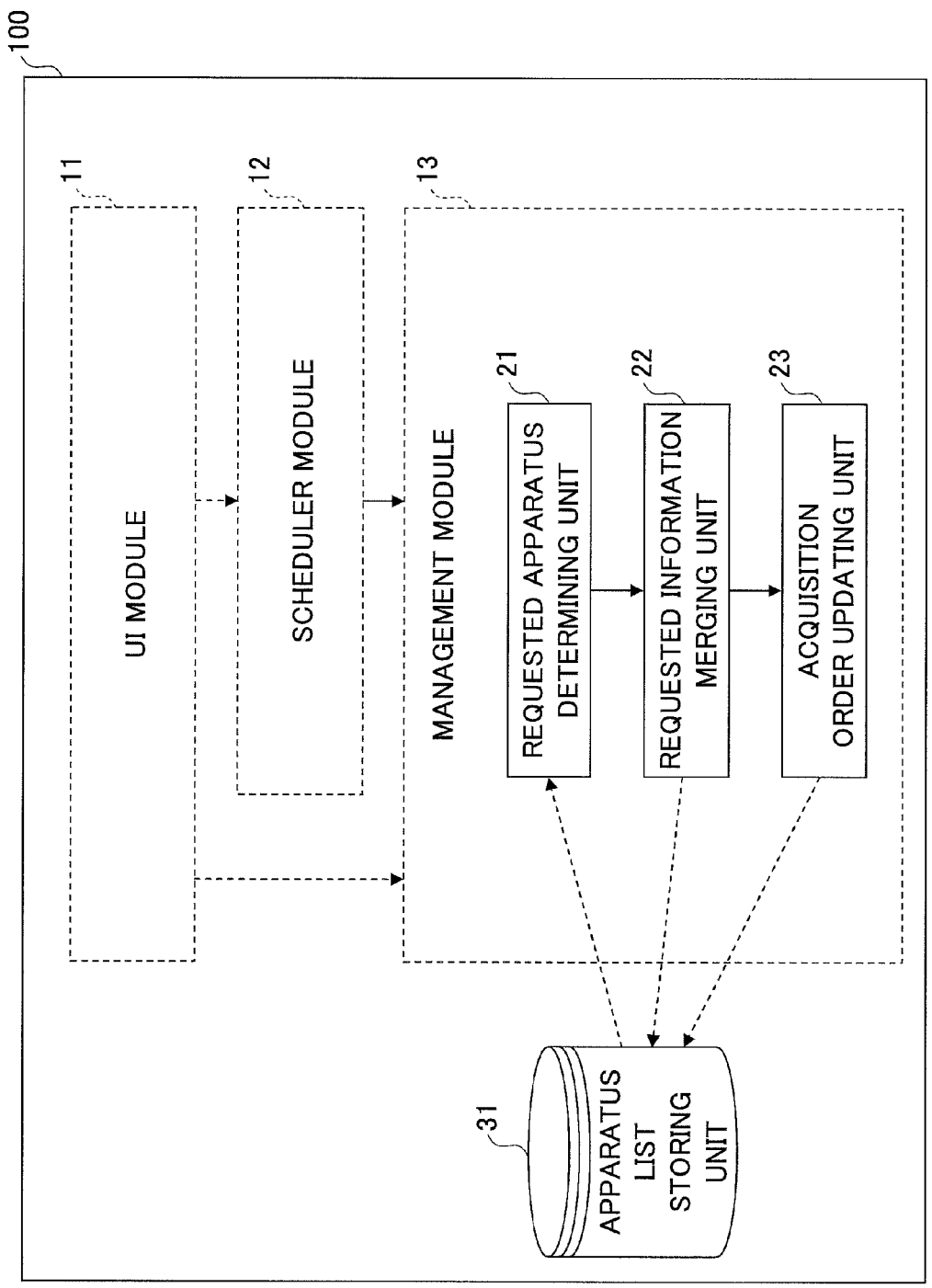
FIG. 8 is a block diagram illustrating an exemplary functional configuration of a management server according to a second embodiment.

FIG. 8 is a block diagram illustrating an exemplary functional configuration of the management server 100 according to the second embodiment.

As illustrated in FIG. 8, the functional configuration of the second embodiment is different from the functional configuration of the first embodiment in that the functional module 13 additionally includes an acquisition order updating unit 23.

The acquisition order updating unit 23 is a functional unit that rearranges the order in which information acquisition requests (or information acquisition queue items) are processed based on priority levels that are recorded in the apparatus list 31D (or specified in the information acquisition requests) and thereby updates the information acquisition order.

An exemplary configuration of the apparatus list 31D including priority levels is described below.

FIG. 9 is a table illustrating an exemplary configuration of the apparatus list (control data) 31D according to the second embodiment.

As illustrated in FIG. 9, the apparatus list 31D includes an acquisition order field, an apparatus identifier field, a requested information field, and a priority level field for each of the communication apparatuses 200 whose apparatus information has been requested.

The priority level field contains information (priority levels) indicating the order of priorities in which apparatus information is obtained from the communication apparatuses 200. The priority levels may be represented, for example, by numbers.

The priority levels in the priority level field are recorded and updated by the management module 13. For example, when generating an information acquisition queue item Q for a received information acquisition request, the management module 13 accesses the apparatus list storing unit 31 and records data corresponding to the received information acquisition request in the apparatus list 31D.

Priority levels may be predetermined for respective information items, and the priority levels of information acquisition queue items may be determined based on the information items specified in the corresponding information acquisition requests. The management module 13 determines the priority levels of information acquisition queue items based on the requested information identifiers specified in the corresponding information acquisition requests and records values indicating the determined priority levels in the priority level field of the apparatus list 31D. As a result, the priority levels corresponding to the requested information items are recorded in the apparatus list 31D for the respective communication apparatuses 200 whose apparatus information has been requested. Here, when multiple information items (requested information identifiers) are specified in an information acquisition request, the management module 13 may be configured to record the highest priority level among the priority levels of the specified information items in the priority level field of the apparatus list 31D.

Referring back to FIG. 8, the acquisition order updating unit 23 refers to the apparatus list 31D and rearranges the order in which the information acquisition queue items Q are processed (i.e., the information acquisition order) based on the recorded priority levels. In other words, the acquisition order updating unit 23 rearranges the order of the information acquisition queue items Q in the queue based on the priority levels. For example, the acquisition order updating unit 23 may rearrange the order of the information acquisition queue items Q by comparing the values indicating the priority levels and sorting the information acquisition queue items Q in descending order of the priority levels based on the comparison results.

When, for example, an information acquisition request including a priority level (specified priority level) is input by the administrator via the UI module 11, the acquisition order updating unit 23 refers to the priority level (recorded priority level) in the priority level field of the apparatus list 31D corresponding to the communication apparatus 200 specified in the information acquisition request. Next, the acquisition order updating unit 23 compares the specified priority level and the recorded priority level and updates the recorded priority level in the apparatus list 31D based on the comparison result. Then, the acquisition order updating unit 23 rearranges the order of the information acquisition queue items Q in the queue based on the priority levels in the apparatus list 31D including the updated priority level.

Exemplary operations of the acquisition order updating unit 23 are described below with reference to FIG. 10.

Figure 10:
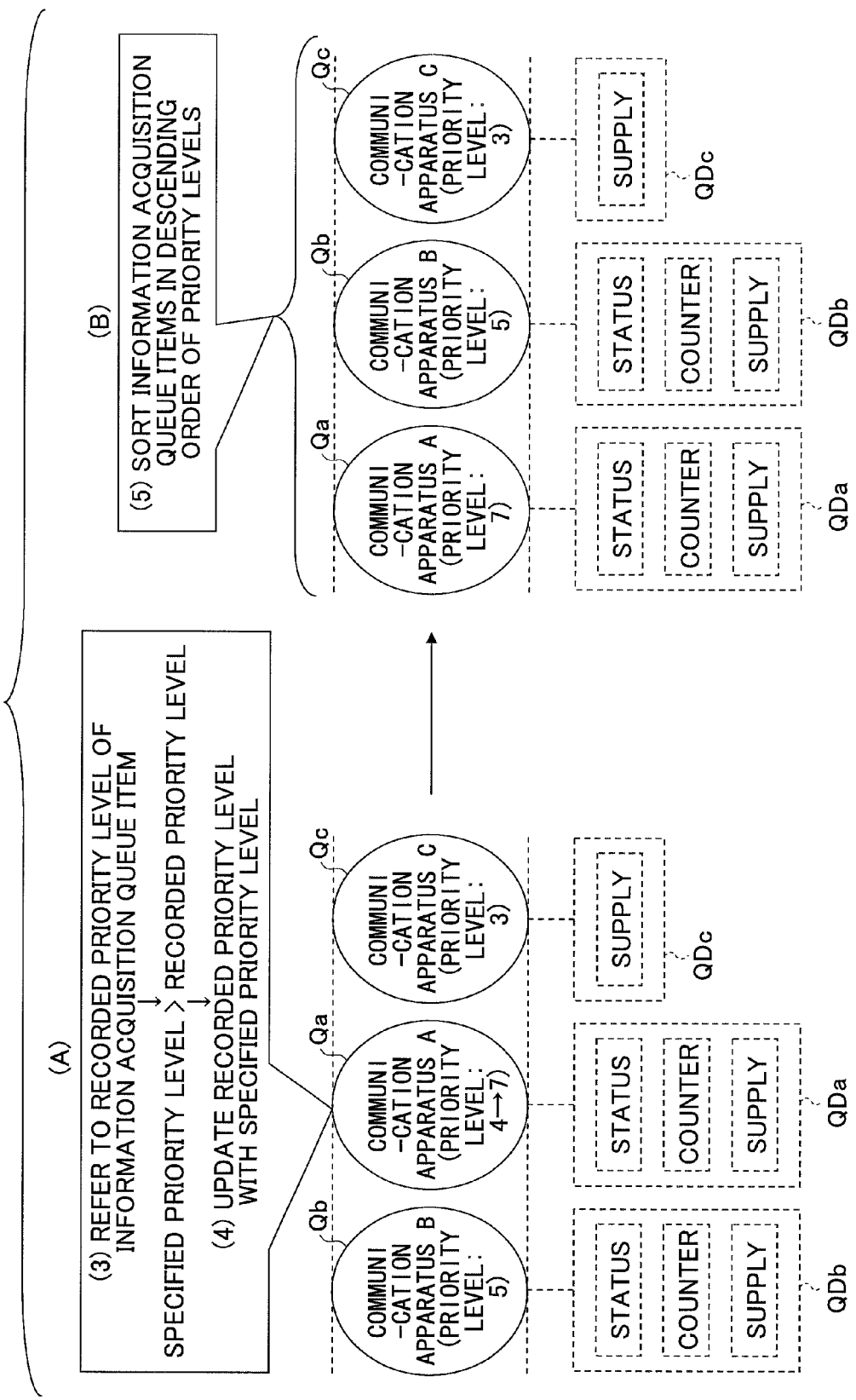
FIG. 10 is a drawing used to describe a process of updating an information acquisition order according to the second embodiment.

FIG. 10 is a drawing used to describe a process of updating an information acquisition order according to the second embodiment.

In FIG. 10, it is assumed that information acquisition queue items Qb, Qa, and Qc for communication apparatuses B, A, and C are arranged in the queue in the order of recorded priority levels, and an information acquisition request (for supply information) including a specified priority level "7" is newly received for the communication apparatus A. FIG. 10 (A) illustrates the information acquisition queue items Qb, Qa, and Qc before they are reordered, and FIG. 10 (B) illustrates the information acquisition queue items Qb, Qa, and Qc after they are reordered. It is also assumed that the requested information identifiers of the information acquisition queue item Qa have been merged in response to the newly-received information acquisition request.

As illustrated in FIG. 10 (A), the acquisition order updating unit 23 refers to the priority level (recorded priority level) in the priority level field of the apparatus list 31D corresponding to the communication apparatus A specified in the newly-received information acquisition request. Next, the acquisition order updating unit 23 determines whether the recorded priority level is lower than a specified priority level in the newly-received information acquisition request. In other words, the acquisition order updating unit 23 determines whether the priority level specified by the administrator is higher than the current priority level of the information acquisition queue item Qa.

When the recorded priority level is lower than the specified priority level, the acquisition order updating unit 23 updates the recorded priority level ("4") in the apparatus list 31D with the specified priority level ("7").

Then, as illustrated in FIG. 10 (B), the acquisition order updating unit 23 changes the order of the information acquisition queue item Qb for the communication apparatus B (priority level=5) and the information acquisition queue item Qa for the communication apparatus A (updated priority level=7) in the queue based on their priority levels. As a result, as illustrated in FIG. 10 (B), the information acquisition queue items Qa, Qb, and Qc for the communication apparatuses A, B, and C are sorted in descending order of priority levels.

With the configuration of the management module 13 of the second embodiment, the administrator can quickly obtain a requested information item from a specified communication apparatus even in a large-scale apparatus management system where information acquisition processes for a large number of communication apparatuses are being performed. Accordingly, the apparatus management system 1 of the second embodiment makes it possible to improve the convenience of the administrator (or users) and to provide a high-quality apparatus management service.

As described above, information processing functions of the management server 100 of the second embodiment are provided through collaboration among the functional units. The functional units are implemented by executing modules (i.e., programs for implementing apparatus management functions) installed in the management server 100.

An exemplary process performed by the functional units of the management server 100 of the second embodiment (collaboration among the functional units) is described below with reference to FIG. 11.

<Information Acquisition Control Process>

Figure 11:
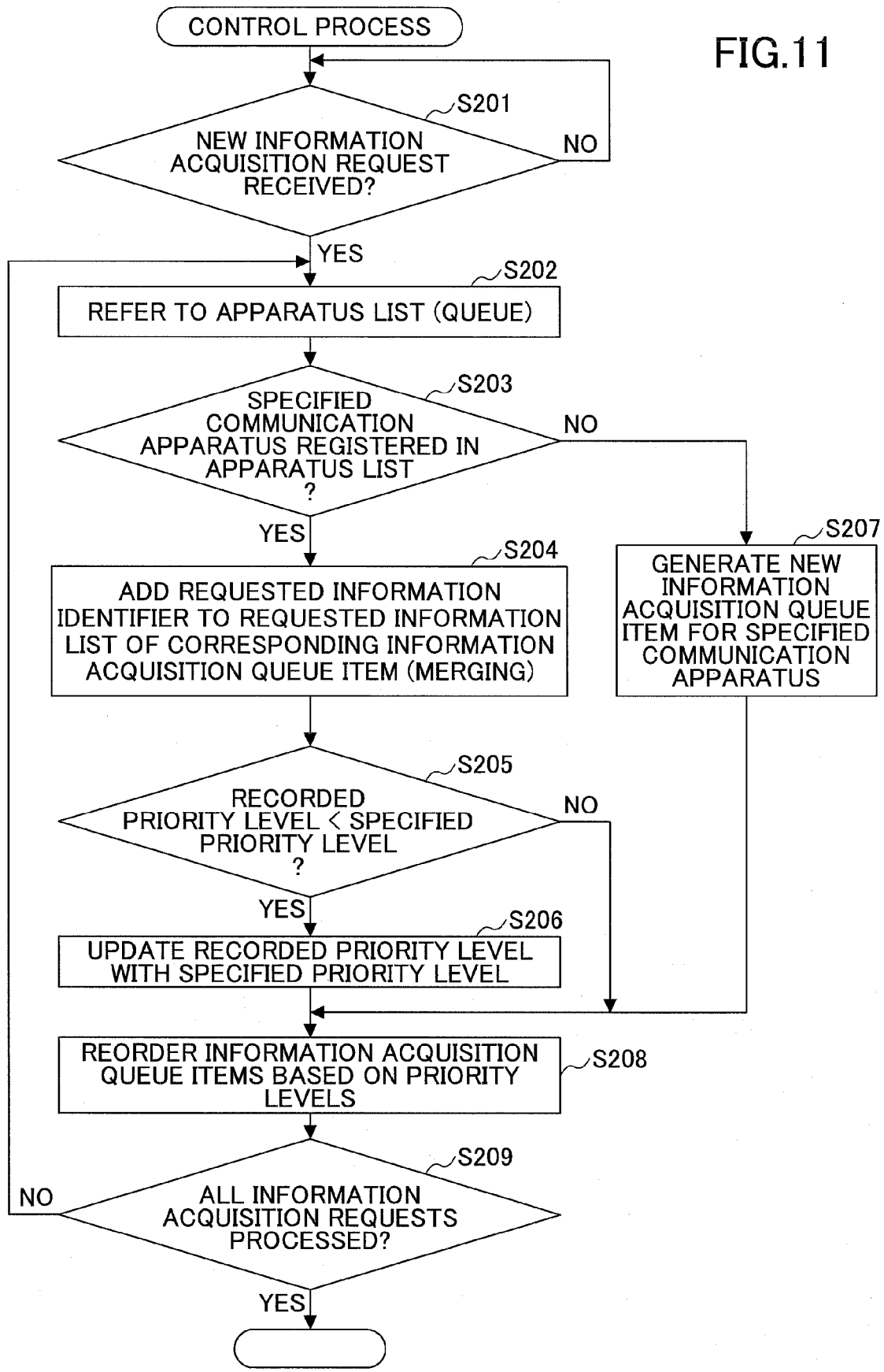
FIG. 11 is a flowchart illustrating an exemplary information acquisition control process according to the second embodiment.

FIG. 11 is a flowchart illustrating an exemplary information acquisition control process according to the first embodiment.

As illustrated in FIG. 11, when the management module 13 of the management server 100 newly receives an information acquisition request (YES in step S201), a control process is performed as described below.

The requested apparatus determining unit 21 accesses the apparatus list storing unit 31 to refer to the apparatus list 31D (step S202).

Next, the requested apparatus determining unit 21 determines whether the communication apparatus 200 specified in the newly-received information acquisition request is registered in the apparatus list 31D (step S203).

If the communication apparatus 200 specified in the newly-received information acquisition request is registered in the apparatus list 31D (YES in step S203), the requested information merging unit 22 adds a requested information identifier specified in the newly-received information acquisition request to a requested information list of the information acquisition queue item Q corresponding to the communication apparatus 200 and thereby merges requested information identifiers for the communication apparatus 200 (step S204).

After the requested information merging step (step S204) is performed by the requested information merging unit 22, the acquisition order updating unit 23 refers to the recorded priority level of the information acquisition queue item Q in the apparatus list 31D and determines whether the recorded priority level is lower than a specified priority level specified in the newly-received information acquisition request (step S205). More specifically, the acquisition order updating unit 23 accesses the apparatus list storing unit 31 to refer to the priority level field of the apparatus list 31D corresponding to the communication apparatus 200. The acquisition order updating unit 23 determines whether the value indicating the recorded priority level in the priority level field is less than the value indicating the specified priority level in the newly-received information acquisition request.

If the recorded priority level of the information acquisition queue Q is lower than the specified priority level (i.e., when the specified priority level is higher than the recorded priority level) (YES in step S205), the acquisition order updating unit 23 updates the recorded priority level (or the field value) in the priority level field of the apparatus list 31D with the specified priority level (or the value indicating the specified priority level) (step S206).

Meanwhile, if the recorded priority level of the information acquisition queue Q is higher than or equal to the specified priority level (i.e., when the specified priority level is lower than the recorded priority level) (NO in step S205), the acquisition order updating unit 23 does not update the recorded priority level in the priority level field of the apparatus list 31D, i.e., skips step S206.

If the communication apparatus 200 specified in the newly-received information acquisition request is not registered in the apparatus list 31D (NO in step S203), the requested information merging unit 22 newly generates an information acquisition queue item Q including the requested information identifier specified in the newly-received information acquisition request for the communication apparatus 200 (step S207) and the process proceeds to step S208. Also, the requested information merging unit 22 accesses the apparatus list storing unit to add information regarding the newly-generated information apparatus queue item Q (which includes a priority level) to the apparatus list 31D.

After step S205/S206/S207, the acquisition order updating unit 23 refers to the apparatus list 31D and rearranges the order of the information acquisition queue items Q according to the (updated or recorded) priority levels in the apparatus list 31D (step S208). More specifically, the acquisition order updating unit 23 compares the priority levels in the priority level field of the apparatus list 31D and sorts the information acquisition queue items Q in the queue in descending order of the priority levels based on the comparison results.

After the information acquisition order updating step (step S208) is performed by the acquisition order updating unit 23, the requested apparatus determining unit 21 determines whether all newly-received information acquisition requests for the communication apparatuses 200 have been processed (i.e., whether steps S202 through S208 have been performed for all the communication apparatuses 200 for which information acquisition requests are newly received) (step S209).

If all the newly-received information acquisition requests have been processed (YES in step S209), the requested apparatus determining unit 21 terminates the control process.

Meanwhile, if not all the newly-received information acquisition requests have been processed (NO in step S209), the control process returns to step S202 and steps S202 through S208 are repeated for the remaining information acquisition requests.

<Summary>

The management module 13 of the management server 100 of the second embodiment provides information processing functions as described below.

When an information acquisition request is newly received, the requested apparatus determining unit 21 of the management module 13 refers to the apparatus list 31D where queued communication apparatuses 200 are registered, and thereby determines whether a communication apparatus 200 specified in the newly-received information acquisition request is already registered in the apparatus list 31D. If the communication apparatus 200 specified in the newly-received information acquisition request is already registered in the apparatus list 31D, the requested information merging unit 22 of the management module 13 adds a requested information identifier specified in the newly-received information acquisition request to a requested information list of the communication apparatus 200 and thereby merges requested information identifiers for the communication apparatus 200.

After the requested information identifiers are merged, the acquisition order updating unit 23 of the management module 13 compares a recorded priority level in the apparatus list 31D corresponding to the communication apparatus 200 with a specified priority level specified in the newly-received information acquisition request and if the specified priority level is higher than the recorded priority level, updates the recorded priority level in the apparatus list 31D with the specified priority level. Then, the acquisition order updating unit 23 rearranges the order of information acquisition queue items Q in the queue according to the updated recorded priority levels and thereby updates the information acquisition order of the information acquisition queue items Q.

With the above configuration of the management module 13 of the management server 100 of the second embodiment, the administrator can quickly obtain a requested information item from a specified communication apparatus even in a large-scale apparatus management system where information acquisition processes for a large number of communication apparatuses are being performed. Accordingly, the apparatus management system 1 of the second embodiment provides advantageous effects similar to those described in the first embodiment and also makes it possible to improve the convenience of the administrator (or users) and to provide a high-quality apparatus management service.

<Variation>

Figure 12:
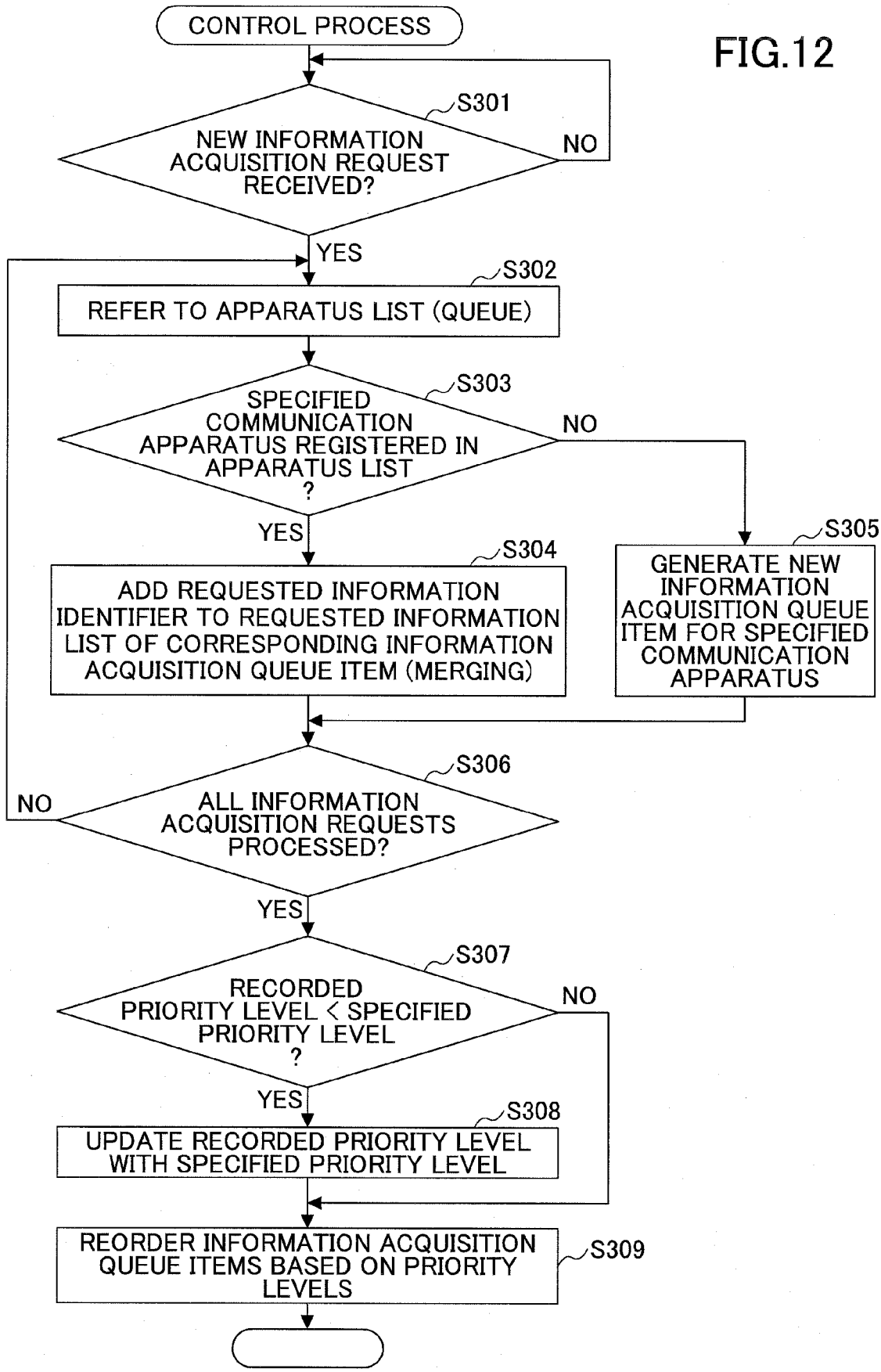
FIG. 12 is a flowchart illustrating an exemplary information acquisition control process according to a variation of the second embodiment.

In the control process of the second embodiment, the requested information merging process (steps S202 through S204) and the information acquisition order updating process (steps S205 through S208) are performed for each communication apparatus 200 for which an information acquisition request is newly received. Alternatively, as illustrated in FIG. 12, the information acquisition order updating process (steps S307 through S309) may be performed after the requested information merging process (steps S302 through S306) is performed for all communication apparatuses 200 for which information acquisition requests are newly received.

The information processing functions of the above embodiments are implemented, for example, by executing a program(s), which is written in a programming language supported by the operating environment (platform) of the management server 100, using a processing unit (i.e., the CPU 106) of the management server 100.

Such a program may be stored in a non-transitory computer-readable storage medium (e.g., the storage medium 103a) such as a floppy (flexible) disk (FD), a compact disk (CD), a digital versatile disk (DVD), a secure digital (SD) memory card, and a universal serial bus (USB) memory. For example, the program stored in the storage medium 103a may be installed in the management server 100 via the drive unit 103. Alternatively, the program may be downloaded and installed via a telecommunication line and the interface unit 107 into the management server 100.

The present invention is not limited to the specifically disclosed embodiments, and variations and modifications may be made without departing from the scope of the present invention.

As described above, an aspect of this disclosure provides an information processing apparatus, an apparatus management system, an information processing method, and a computer-readable storage medium storing a program that make it possible to reduce the communication load and the processing time for obtaining apparatus information from communication apparatuses in a large-scale system.

What is claimed is:

1. A method performed by an apparatus management device having one or more processors, the apparatus management device being connected via a network to communication apparatuses, the method comprising:
receiving, by the one or more processors, an information acquisition request for a specified communication apparatus of the communication apparatuses;
determining, by the one or more processors, whether a queue item for the specified communication apparatus has already been generated;
when the queue item for the specified communication apparatus has already been generated, searching, by the one or more processors, an apparatus list to find an unprocessed information acquisition request that has been sent previously for the specified communication apparatus and has not been processed;
when the unprocessed information acquisition request is found, generating, by the one or more processors, an information list by combining the received information acquisition request and the unprocessed information acquisition request; and
executing, by the one or more processors, an information acquisition process for the received information acquisition request and the unprocessed information acquisition request based on the generated information list.

2. The method as claimed in claim 1 further comprising determining, by the one or more processors, whether an information item corresponding to identification information of the specified communication apparatus included in the received information acquisition request exists in the apparatus list.

3. The method as claimed in claim 1, wherein the apparatus list records information acquisition requests for the communication apparatuses in association with the identification information of the communication apparatuses.

4. The method as claimed in claim 1 further comprising performing, by the one or more processors, the information acquisition based on the received information acquisition request and the unprocessed information acquisition request being recorded in sequence so that the received information acquisition request and the unprocessed information acquisition request can be processed at once.

5. An apparatus management device connected via a network to communication apparatuses, the apparatus management device comprising:
a storage unit configured to store a program; and
one or more processors configured to execute the program, wherein the program which, when executed by the one or more processors, functions as:
a receiving unit that receives an information acquisition request for a specified communication apparatus of the communication apparatuses;
a determining unit that determines whether a queue item for the specified communication apparatus has already been generated;
a searching unit that searches an apparatus list to find an unprocessed information acquisition request that has been sent previously for the specified communication apparatus and has not been processed, when the queue item for the specified communication apparatus has already been generated;
a generating unit that generates an information list by combining the received information acquisition request and the unprocessed information acquisition request, when the unprocessed information acquisition request is found; and an execution unit that executes an information acquisition process for the received information acquisition request and the unprocessed information acquisition request based on the generated information list.

\* \* \* \* \*